United States Patent Office 3,145,101
Patented Aug. 18, 1964

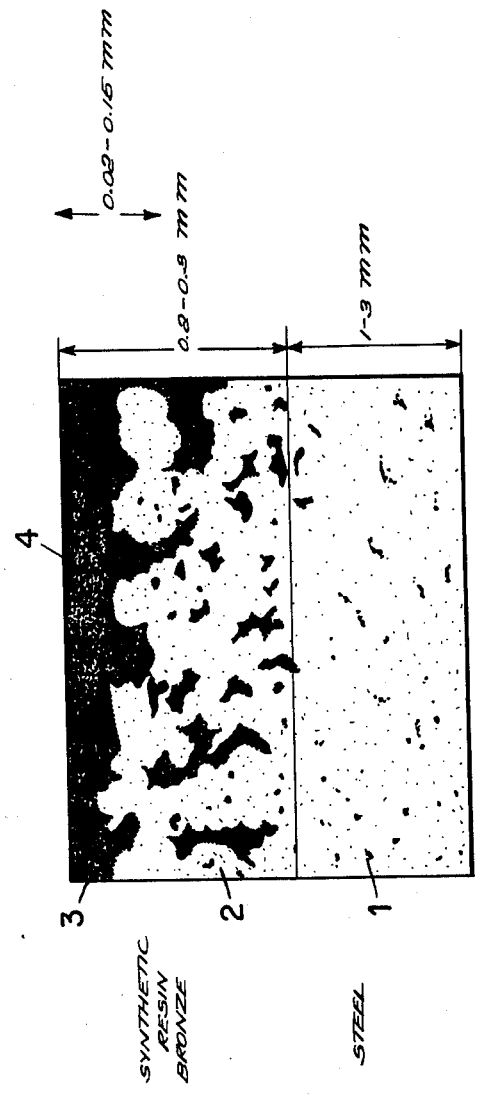

3,145,101
COMPOUND MATERIALS AND METHODS OF PRODUCING THE SAME
Hermann Franssen, Krefeld, Germany
Filed Mar. 30, 1961, Ser. No. 99,498
6 Claims. (Cl. 75—201)

The invention is directed to the problem of rendering substances which have certain physical or chemical properties useful for purposes for which, in addition to the aforesaid properties, other properties, not possessed by the substances alone, are also required. This problem will be explained in more detail with the aid of examples.

The frictional property of glass which is beneficial for a number of purposes cannot be utilised because the heating produced by friction, owing to the friability of glass, leads to a superficial destruction, or to destruction at a deeper level.

Lead is a material having excellent properties for bearings for special purposes, yet its use is restricted where high bearing pressures occur because it is lacking in the necessary strength.

Fluorine-hydrocarbon compounds have highly advantageous sliding properties for bearing purposes, but their very considerable coefficient of expansion is a disadvantage when heating occurs. The ability of these substances to carry away heat is, however, poor.

Diamond or other abrasive media require for their use a compound such that the individual grain is held firmly while however the cutting edges remain free. This binding medium must be capable, while retaining the requisite mechanical strength, of absorbing the high cutting force produced at the grain edge, e.g., in a grinding process. For this reason, diamond grains are in particular bound in with metallic materials. The bringing together of the metal particles, for example bronze or hard metal, has been effected hitherto by sintering methods. Particularly in the case of hard metal, the danger exists that with the necessarily high sintering temperature disturbance of the diamond structure will result and conversion thereof to graphite occur. When bronze is used, only the strength attainable by sintering methods for this material can be obtained.

In all the examples quoted it is therefore desirable for a metallic material to be additionally present to supply the qualities lacking, such as strength or thermal conductivity. The use of such mixtures of substances in the form of solid bodies is not new per se. Mention may be made, for example, merely of abrasive materials, bearing materials or contact materials in which mixtures of metallic and nonmetallic components or of different metallic components in extremely fine dispersion constitute a compound body. The production of such compound bodies may take place by various methods, a skeleton being formed in the first case from the metallic components, say by means of pressing and/or sintering, and being thereafter subsequently filled with the substance possessing the desired properties, or else mixtures of metallic compounds may be subjected together to a pressing and/or sintering operation.

With such compound bodies it is, as a rule, necessary that the component which introduces the mechanical strength and thermal conductivity shall be coherent in itself, while the material possessing the specific desired property does not always need to be so. In other words, in order, for example, to manufacture a body with lead as the bedding material and copper as skeleton, it is not necessary to ensure that the lead is coherent in itself. On the other hand, it is important that the copper, which is intended to carry off the heat and to supply mechanical strength, shall be coherent. Bodies of this type can be produced by the sintering method, while however there is then a danger of the lead separating the individual copper particles from one another, in which case the body so produced will lack adequate mechanical strength.

The object of the present invention is accordingly to produce a compound body in such a manner that the skeleton giving the mechanical strength is in all circumstances coherent in itself, whereas the filling material having the specific property required is embedded in said skeleton, no absolute value being placed on its coherence.

This result may be achieved in accordance with the present invention by soldering a metal powder of suitable physical and chemical nature by means of a metal of lower melting point in such a manner that a sufficient residual volume remains to take up the substance possessing the specific property.

Further objects and advantages of the invention will appear more fully from the following description, particularly when taken in conjunction with the accompanying drawing which shows a material in accordance with the invention.

In the drawing, which is a microphotographic enlargement, there is a steel bearing layer 1, which may have a thickness of one to three mm. A porous metallic layer 2 of bronze or lead-bronze is soldered to the steel backing tightly. This porous layer is filled with polyoxymethylene 3, in such a way that its exposed surface is formed of pure polyoxymethylene, as indicated at 4. The porous layer inclusive of the layer of polyoxymethylene may be for example 0.2 to 0.3 mm. thick, while the polyoxymethylene is principally in the superficial portion of the layer of the thickness of 0.02 to 0.15 mm.

Details of the procedure which may be followed will be described with reference to some examples:

(1) A body pressed from iron powder is heated to a temperature exceeding the melting point of copper, and after this temperature has been attained copper is added in an amount such that while the individual iron particles are soldered together a sufficient pore space is nevertheless left. In this form, the body can be used, provided the residual pore space is coherent, for example as a filter. Powdered glass can however also be caused to flow into said pore space and if desired made uniform by further heat treatment.

(2) A mixture of iron powder, with preferably a small amount of copper powder is shaped into a mould and heated to a temperature above the melting point of copper. A body is thus produced which likewise leaves a pore space. It can be used thus as a filter body; or ground glass may be introduced into it. The further procedure may be as described in the first example.

(3) A mixture of iron and glass powder is shaped into a mould and heated to a temperature above the melting point of copper, whereupon copper is added in an amount such that the iron particles are mutually soldered.

(4) A mixture of iron powder, copper powder and glass powder is pressed and heated to a temperature exceeding the melting point of copper.

(5) Lead may be embedded in copper alloys, for example, in such a way that a mixture of copper and lead is pressed with tin dioxide and heated in the presence of a protective gas to a temperature such that the tin dioxide is reduced to metal by the hydrogen of the protective gas, and the tin thus formed solders the copper particles together.

(6) Abrasive objects can be produced from diamond or other abrasive materials, for example by pressing a mixture of iron and powder and diamond or abrasive media of some other kind into the required shape and soldering by means of copper.

(7) A mould formed of copper powder is heated to a temperature above the melting point of tin, and when this temperature is attained tin is added in an amount such that while the individual copper particles are soldered together an adequate pore space is left. In this form the article may be used, for example as a filter, provided the residual pore space is coherent. In said pore space, however, a lubricant, constituted by a synthetic plastic material, such as of polyoxymethylene may for example also be introduced and consolidated or sintered or otherwise distributed uniformly as required, by subsequent heat treatment.

(8) A mixture of copper powder with a conveniently small amount of tin powder is shaped into a mould and heated to a temperature exceeding the melting point of tin. A body is thus produced which also leaves a pore space free. It can be used as a filter body, or there may be introduced thereinto the synthetic material mentioned under (7) above. The further procedure may be as outlined in Example 7.

(9) The embedding of lead in copper alloys may be effected for example as follows: a mixture of copper and lead with tin dioxide is reduced to metal by the hydrogen contained in a protective gas, and the tin thus formed solders the copper particles to one another.

(10) A body is produced from copper powder, or complex copper-lead powder with the simultaneous admixture of tin dioxide, for example in the form of meta-stannic acid, by moulding or pouring on, and heated with reducing protective gas to a temperature such that in the process the stannic acid is reduced above the melting point of tin to metallic tin, while the tin in statu nascendi becomes alloyed with the copper or copper-lead mixture and forms a skeleton which is coherent in itself and yet leaves an ample residual pore space, which can be filled after the soldering treatment with a material, such as the synthetic plastic material mentioned under (7) above.

In the Examples 3 to 6 no special after-treatment is required, while however in all cases, if so desired or if it appears advantageous for any reasons, the body may be subjected to forging at elevated temperature, whereby, in many cases, besides shaping, a reconsolidation is affected.

It is the principle of the invention therefore to form a coherent skeleton in such a manner that the powder of a metal having the necessary strength or thermal conductivity or other properties (for example that of resistance to calcination of tungsten in the case of switch contacts of tungsten-silver) is soldered together by the addition of a metal of a lower melting point than said first metal. It is possible by this method for the material possessing the specific properties to have been immediately incorporated or admixed or when the soldering occurs or for it to be added only after the soldering operation.

It may be desirable in special instances for a soldering metal with a very low melting point to be used only at a relatively high temperature. Should such a soldering metal of low melting point be used at low temperature, there may at times be a danger that the body will collapse because no alloy formation occurs or because a larger amount of the soldering metal must be used. At higher temperatures, on the other hand, it is possible—and often desirable—for an alloy formation to be effected between the metal of high melting point and that of low melting point, without there being any destruction of the external shape of said body. To give an example of this way of introducing a soldering metal, let us take the formation of a bronze skeleton by soldering copper and tin. Bronze skeletons have the advantage of substantial mechanical strength. The bronze skeletons known heretofore, however, have simply been obtained through the sintering of bronze powders and therefore have not as a general rule the firm bond between the individual particles such as soldered skeletons possess. In order, however, to promote the diffusion of tin in copper, elevated temperatures of, for example, 600° to 800° C. or more are required, which it is inadvisable to attain when tin metal is being used as solder because deliquescence takes place. With the assistance of the present invention, the soldering metal can in this case be added in the form of a chemical compound, especially (for the present instance) its oxide, and the decomposition of the chemical compound only permitted to take place at high temperature, in this case through the reduction of the stannic oxide with hydrogen. This is brought about in two ways, i.e., through the fact that the tin oxide is only broken down at high temperature by hydrogen or gases containing hydrogen, and on the other hand through the fact that the hydrogen-containing gases are only allowed to be added at the desired soldering and diffusion temperature.

A compound body can according to this also be made from copper and glass by soldering together with tin formed in the reduction of stannic oxide.

In connection with the use of glass in abrasive material, which may possibly happen in common with the use of graphites, it should further be mentioned that owing to the known property which glasses have of chemically binding silicones to their surface, the possibility is afforded of permanently introducing silicones as lubricants into the limit layer of two bodies in frictional contact with one another, whereby the qualities of the silicones with a beneficial effect on the frictional character can be more efficiently utilised and applied.

Materials according to the invention can be joined in known manner in laminated form with other supporting materials, for example by sticking, soldering, welding or similar operations. In particular, the joining may be effected in the same working step as the soldering of the skeleton. It is also possible for the power or powder mixture forming the skeleton to be dispersed over or laid on the supporting element (without the application of additional pressure), if desired with the addition of further solder, and for the heat treatment then to be carried out above the solder melting temperature.

The possibility also exists of introducing between the compact base material serving as the support and the layer of material to be bound during soldering, a layer of material, for example in pulverulent form, having a somewhat lower melting point than that corresponding to the treatment temperature used for the soldering operation. For example, when using an underlying layer of steel and a porous layer of a 6% bronze or a porous layer of copper containing an addition of 6% of tin or the equivalent thereof in stannic acid, an intermediate layer having a higher tin content, for example 10 or 14%, could be employed, the melting point whereof is lower than the temperature at which the 6% copper-tin alloy is formed. In this case also a porous skeleton is produced which is soldered to the steel constituting the carrier material by a molten layer.

When using the material according to the invention for specially shaped objects, it may first be worked up to the semi-finished article and prior to or subsequent to the soldering may be developed to the final form. If the material is required to be worked up as a plating material, the element to be used for plating can be cut out from the said material and plated on by metallurgical means. In such case, the moulded parts can be cut out from the semi-finished product, using the base body or a model corresponding thereto as matrix with the assistance of a rubber cushion, and applied by sintering. It is also possible for the mouldings to be cut off from the semi-finished product, with allowance in relation to the base body, and, after sintering on, to be brought to the final shape.

Utilising the principle of the invention as characterised herein above, it is also possible in particular to produce frictional or bearing material having advantageous properties.

It is known that lead bronze, i.e., a heterogeneous, intimate mixture of copper with lead, is highly suitable for bearing purposes. It is further known that such mixtures can only be used with advantageous effect when applied in not too thick a layer on a carrier support, usually of steel. These materials composed of a steel support with applied lead bronze are produced by various methods. One such method consists for example in pouring the lead-copper mixture on to the preheated steel band, followed by cooling and machining to size. Another method of production is that of sintering a lead-copper mixture on to the steel carrier. In both methods of production it is necessary after the bending of the bushing to carry out further machining to the final dimensions of the bearing, since having regard to the poor tenacity of the lead-copper alloy it is not possible to subject the latter to the bending stress in an accurately finished condition. It is furthermore desirable that these alloys should be as far as possible free from pores and compact, so that the unilateral pressure and impact stresses occurring when the bearing is in use do not give rise to premature fatigue and attrition of the material. One undesirable characteristic of these bearings is that they have a relatively poor stability in respect of temperature, because the lead forming an ingredient of the structure exhibits a plastic character even at low temperatures—and sometimes room temperature—whereby irreversible deformations may occur.

These considerations have a practical application also in respect of copper-tin-lead or copper-tin materials or similar alloys used for bearing purposes.

It has now been found that these deficiencies can be overcome if according to the invention the slide material layer is permeated by a plastically deformable substance which gives it the necessary mechanical rigidity without thereby reducing the favourable sliding properties. To this end, the bearing material mixture is advantageously first brought not to a dense but to a porous form, yet one which is coherent in itself, whereupon the additional material is introduced. In a simple form it is also possible to do this by adding to the mixture in powder form a substance which is capable of soldering the individual metal particles to one another, for example tin. It is however, preferable to add a material which effects the soldering only at a higher temperature than does tin, because a more uniform and firmer bonding of the individual particles by the solder may then be expected. This may be done by adding, instead of metallic tin, tin oxide, which is reduced by the protective gas, under which the heating is carried out, at a temperature of for example 700° or 800° C., so that only at this temperature elementary tin in statu nascendi comes into contact with, for example, copper or lead. In this way a better absorption of the tin into the other material is effected, whereby at the same time a consolidation of the metal is brought about, giving the bearing subsequently an improved bearing strength. Since metallic tin takes up a lesser volume than tin oxide, at all points at which the reduction of the tin oxide to tin takes place a formation of pores is to be expected, which can be utilised for subsequent filling with a further material.

One example of the practical performance of the method is as follows:

A mixture of lead-copper complex powder with tin oxide, for example in an amount of 5–8%, is brought to a suitable shape, if desired, e.g., is pressed or rolled. It is then placed upon a steel underlying body, possibly with interposition of an intermediate layer which has the effect of promoting the bonding, and subjected to a thermal treatment under a protective gas. In this way a body is produced composed of a steel support on which there is a firmly bonded porous layer of copper-tin-lead which, depending on the treatment temperature, for example above 800° C., exhibits greater or lesser mechanical strength. In this condition the material can already be deformed by pressing or rolling to an extent permitting appreciable modification of its dimensions. Due to the alloy between the copper and tin, the said body is moreover already more solid against impact and pressure stresses than a body containing no addition of tin. By impregnating its residual pore volume with a substance which is stable in respect of volume, for example synthetic plastic substances, particularly polyoxymethyline, such a body can be filled to such an extent as to retain its solidity under rolling, pressing or bending treatments without the lead-copper mixture suffering attrition of its structure. In this way, it is possible to obtain bodies capable of being rolled out or pressed to prescribed dimensions within very narrow tolerances, with the result that after the subsequent bending treatment by which they are formed into bushings, no further finishing is required.

Known methods may be used by which bending of strips to form bushings can be carried out so precisely that after the bending no further treatment is necessary.

The filling materials or synthetic plastic to be used for filling up the volume of pores may conveniently be of such a character as to possess properties which assist sliding, so that thereby the quality of the slide material is even further improved. It is especially adventageous for such substances to possess no adhesive properties, that is to say, have the static and sliding friction value practically equal, so that an amplification of oscillations, a so-called "stick-slip effect," is avoided.

What I claim is:

1. A method of producing a bearing comprising shaping into a moulded part on a still base a powder of at least one substance having a higher melting point than tin oxide selected from the group consisting of metals and metal alloys in admixture with tin oxide, subjecting such moulded part in the presence of a protective gas containing hydrogen to a temperature sufficient to reduce the tin oxide, whereby to solder the particles of such substance to one another and to leave residual pore spaces therebetween, and introducing poloxymethylene into said pore spaces.

2. In a process as claimed in claim 1, said substance being copper powder.

3. In a process as claimed in claim 1, said substance being complex copper-lead powder.

4. A method of producing a friction material comprising shaping into a moulded part a powder of at least one substance selected from the group consisting of metals and metal alloys having a higher melting point than tin oxide in admixture with tin oxide, applying such part on a steel support, subjecting such support and moulded part in the presence of a protective gas containing hydrogen to a temperature sufficient to reduce the tin oxide whereby to solder the particles of such substance to one another and to leave residual pore spaces therebetween, and introducing polyoxymethylene into said pore spaces.

5. In a process as claimed in claim 4, said substance being complex copper-lead powder.

6. A method of producing a friction material comprising sprinkling on a steel support a powder of at least one substance selected from the group consisting of metals and metal alloys having a higher melting point than tin oxide in admixture with tin oxide, and subjecting such support and layer in the presence of a protective gas containing hydrogen to a temperature sufficient to reduce the tin oxide whereby to solder the particles of such substance to one another and to leave residual pore spaces therebetween, and introducing polyoxymethylene into said pore spaces.

References Cited in the file of this patent

UNITED STATES PATENTS

| | | |
|---|---|---|
| 2,133,761 | Tietig | Aug. 30, 1937 |
| 2,251,410 | Koehring | Aug. 5, 1941 |
| 2,273,589 | Olt | Feb. 17, 1942 |
| 2,397,831 | Bellamy | Apr. 2, 1946 |
| 2,689,380 | Tait | Sept. 21, 1954 |

FOREIGN PATENTS

| | | |
|---|---|---|
| 726,127 | Great Britain | Mar. 16, 1955 |